United States Patent
West et al.

(10) Patent No.: US 12,009,497 B2
(45) Date of Patent: Jun. 11, 2024

(54) POLYMER-BASED BATTERY PACK ENCLOSURE ASSEMBLIES WITH INTEGRATED THERMAL MANAGEMENT FEATURES

(71) Applicant: FORD GLOBAL TECHNOLOGIES, LLC, Dearborn, MI (US)

(72) Inventors: Liam West, Southfield, MI (US); Patrick Daniel Maguire, Ann Arbor, MI (US); Kanchana Perumalla, Troy, MI (US); Mohammadreza Eftekhari, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 812 days.

(21) Appl. No.: 16/568,660

(22) Filed: Sep. 12, 2019

(65) Prior Publication Data
US 2021/0083343 A1    Mar. 18, 2021

(51) Int. Cl.
*H01M 10/6556* (2014.01)
*H01M 10/613* (2014.01)
*H01M 10/625* (2014.01)
*H01M 10/6554* (2014.01)
*H01M 10/6568* (2014.01)
*H01M 50/20* (2021.01)

(52) U.S. Cl.
CPC ..... *H01M 10/6556* (2015.04); *H01M 10/613* (2015.04); *H01M 10/625* (2015.04); *H01M 10/6554* (2015.04); *H01M 10/6568* (2015.04); *H01M 50/20* (2021.01); *H01M 2220/20* (2013.01)

(58) Field of Classification Search
CPC ........... H01M 10/6556; H01M 10/613; H01M 10/625; H01M 10/6554; H01M 10/6568
See application file for complete search history.

(56) References Cited

U.S. PATENT DOCUMENTS

| 6,087,036 | A  | * | 7/2000 | Rouillard | H01M 10/0468 |
|   |   |   |   |   | 429/66 |
| 8,830,676 | B2 |   | 9/2014 | Borck et al. |   |
| 2013/0004822 | A1 | * | 1/2013 | Hashimoto | H01M 10/6556 |
|   |   |   |   |   | 429/120 |
| 2014/0023906 | A1 | * | 1/2014 | Hashimoto | H01M 50/24 |
|   |   |   |   |   | 429/120 |
| 2014/0072844 | A1 | * | 3/2014 | Oh | H01M 10/6563 |
|   |   |   |   |   | 429/71 |

(Continued)

FOREIGN PATENT DOCUMENTS

| DE | 102016200088 A1 | 7/2017 |
| WO | 2013/020707 A2 | 2/2013 |
| WO | 2015/113858 A2 | 8/2015 |

*Primary Examiner* — Matthew J Merkling
(74) *Attorney, Agent, or Firm* — David B. Kelley; Carlson, Gaskey & Olds, P.C.

(57) ABSTRACT

This disclosure details exemplary battery pack designs for use in electrified vehicles. Exemplary battery packs may include a polymer-based enclosure assembly having features for thermally managing internal components of the battery pack. In some embodiments, the enclosure assembly may include molded-in fluid channels or molded-in tubing for establishing a cooling circuit of the battery pack. In other embodiments, the enclosure assembly may include molded-in channels that receive tubing for establishing a cooling circuit of the battery pack.

8 Claims, 8 Drawing Sheets

(56) References Cited

U.S. PATENT DOCUMENTS

| | | | |
|---|---|---|---|
| 2015/0280293 A1* | 10/2015 | Guignard | H01M 10/625 |
| | | | 429/120 |
| 2017/0338532 A1* | 11/2017 | Mott | H01M 10/659 |
| 2019/0210469 A1* | 7/2019 | Yang | C08L 67/06 |
| 2019/0214615 A1* | 7/2019 | Hilmann | B60L 3/0007 |
| 2019/0221905 A1* | 7/2019 | Shimizu | H01M 10/6556 |
| 2020/0398652 A1* | 12/2020 | Stephens | B60L 58/26 |

* cited by examiner

POLYMER-BASED BATTERY PACK ENCLOSURE ASSEMBLIES WITH INTEGRATED THERMAL MANAGEMENT FEATURES

TECHNICAL FIELD

This disclosure relates generally to electrified vehicle battery packs, and more particularly to polymer-based battery pack enclosure assemblies that include features for thermally managing battery internal components of the battery pack.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery cells that store energy for powering these electrical loads. Various other internal components, including but not limited to a battery electric control module (BECM), a bussed electrical center (BEC), wiring, and I/O connectors, must also be housed inside the enclosure assembly. The battery internal components may generate heat during certain conditions.

SUMMARY

A battery pack according to an exemplary aspect of the present disclosure includes, among other things, an enclosure assembly including a polymer-based component and a channel or tubing integrated into a floor of the polymer-based component. The channel or tubing is configured to establish a cooling circuit for thermally managing a battery internal component housed within the polymer-based component.

In a further non-limiting embodiment of the foregoing battery pack, the polymer-based component is a tray made of an expanded polymer-based material.

In a further non-limiting embodiment of either of the foregoing battery packs, the polymer-based component is a tray made of a solid polymer-based material.

In a further non-limiting embodiment of any of the foregoing battery packs, the channel is a molded-in channel formed in the floor of the polymer-based component.

In a further non-limiting embodiment of any of the foregoing battery packs, a heat exchanger plate is received over the molded-in channel to establish a serpentine passage of the cooling circuit between the channel and the heat exchanger plate.

In a further non-limiting embodiment of any of the foregoing battery packs, the heat exchanger plate is secured to the floor by a structural adhesive.

In a further non-limiting embodiment of any of the foregoing battery packs, the heat exchanger plate is secured to the polymer-based component by an overmolding.

In a further non-limiting embodiment of any of the foregoing battery packs, the channel is a molded-in channel formed in the floor, and the tubing is received within the molded-in channel.

In a further non-limiting embodiment of any of the foregoing battery packs, the tubing is integrated into the floor by an overmolding.

In a further non-limiting embodiment of any of the foregoing battery packs, the battery internal component is a battery array, a bussed electrical center (BEC), or a battery electric control module (BECM).

A battery pack according to another exemplary aspect of the present disclosure includes, among other things, an enclosure assembly including a tray and a cover received over the tray, a molded-in channel formed in a floor of the tray, a heat exchanger plate secured over the molded-in channel, and a structural adhesive or an overmolding securing the heat exchanger plate to the floor.

In a further non-limiting embodiment of the foregoing battery pack, the tray is an expanded polymer-based tray and the cover is a solid polymer-based cover.

In a further non-limiting embodiment of either of the foregoing battery packs, the enclosure assembly includes a mid-tray received between the tray and the cover.

In a further non-limiting embodiment of any of the foregoing battery packs, the mid-tray establishes an electrical subassembly within the enclosure assembly.

In a further non-limiting embodiment of any of the foregoing battery packs, the molded-in channel is formed in a first open area of the tray, a second open area of the tray, or both.

In a further non-limiting embodiment of any of the foregoing battery packs, a battery array is received within the first open area. The battery array is in thermal contact with the heat exchanger plate.

In a further non-limiting embodiment of any of the foregoing battery packs, the molded-in channel and the heat exchanger plate establish a serpentine coolant passage between the molded-in channel and an interior surface of the heat exchanger plate.

In a further non-limiting embodiment of any of the foregoing battery packs, the structural adhesive includes an epoxy.

In a further non-limiting embodiment of any of the foregoing battery packs, the molded-in channel is countersunk into the floor.

In a further non-limiting embodiment of any of the foregoing battery packs, a thermal enhancement feature protrudes from a surface of the molded-in channel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery packs may include a polymer-based enclosure assembly having features for thermally managing internal components of the battery pack. In some embodiments, the enclosure assembly may include molded-in fluid channels or molded-in tubing for establishing a cooling circuit of the battery pack. In other embodiments, the enclosure assembly may include molded-in channels that receive tubing for establishing a cooling circuit of the battery pack. These and other features are discussed in greater detail in the following paragraphs of this detailed description.

Figure 1:
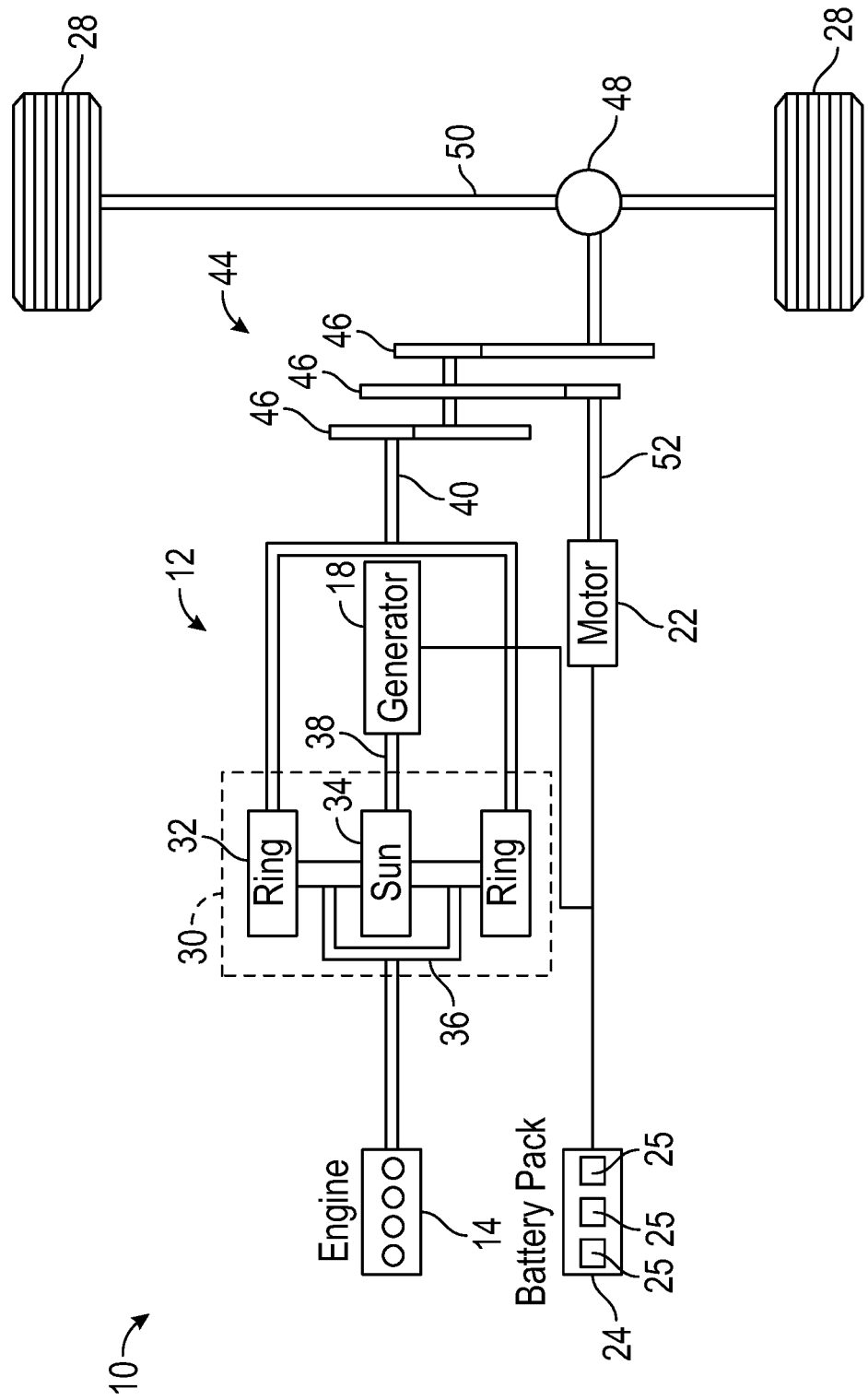
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
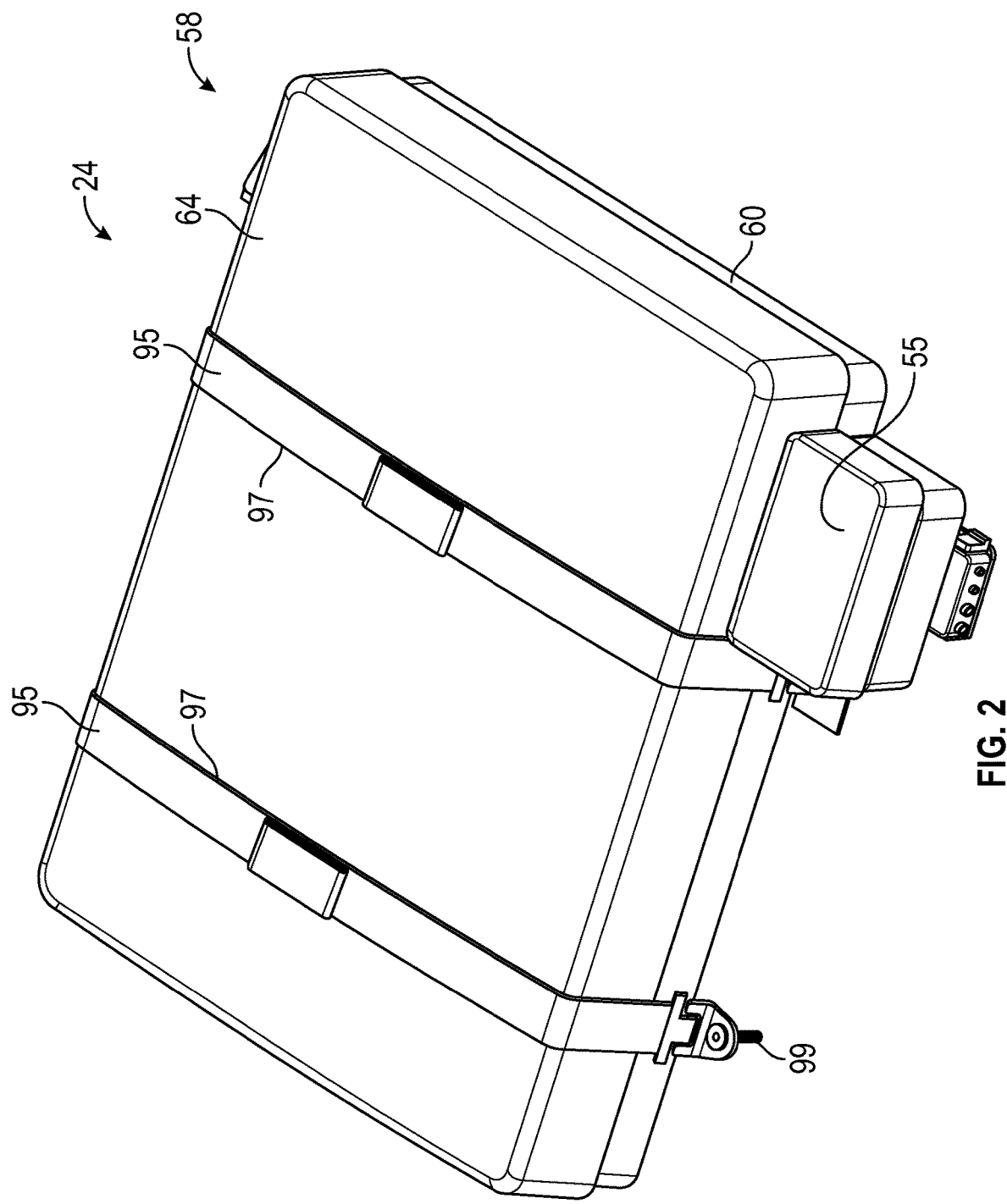
FIG. 2 illustrates a battery pack of an electrified vehicle.
Figure 3:
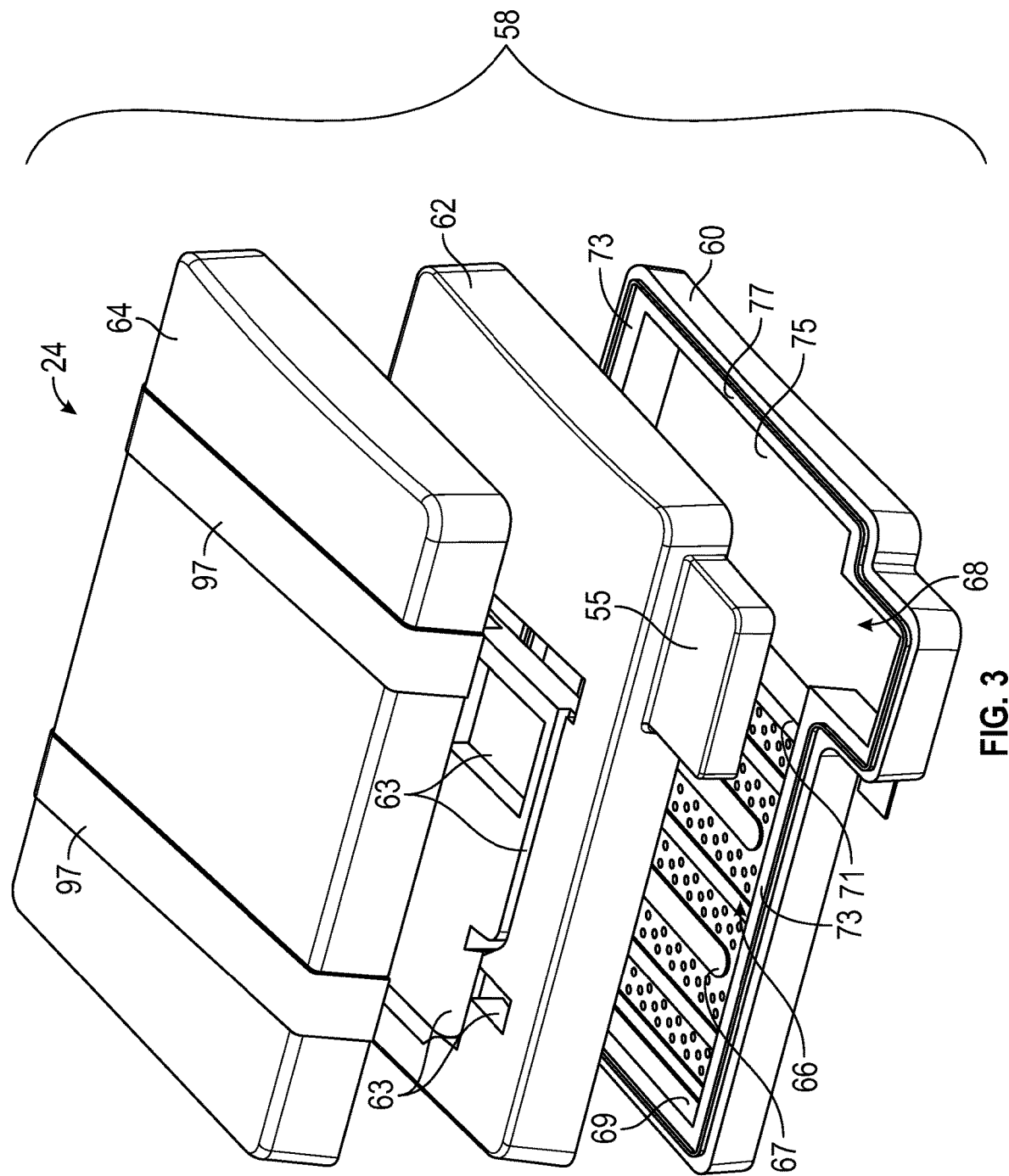
FIG. 3 is an exploded view of an enclosure assembly of the battery pack of FIG. 2.
Figure 4:
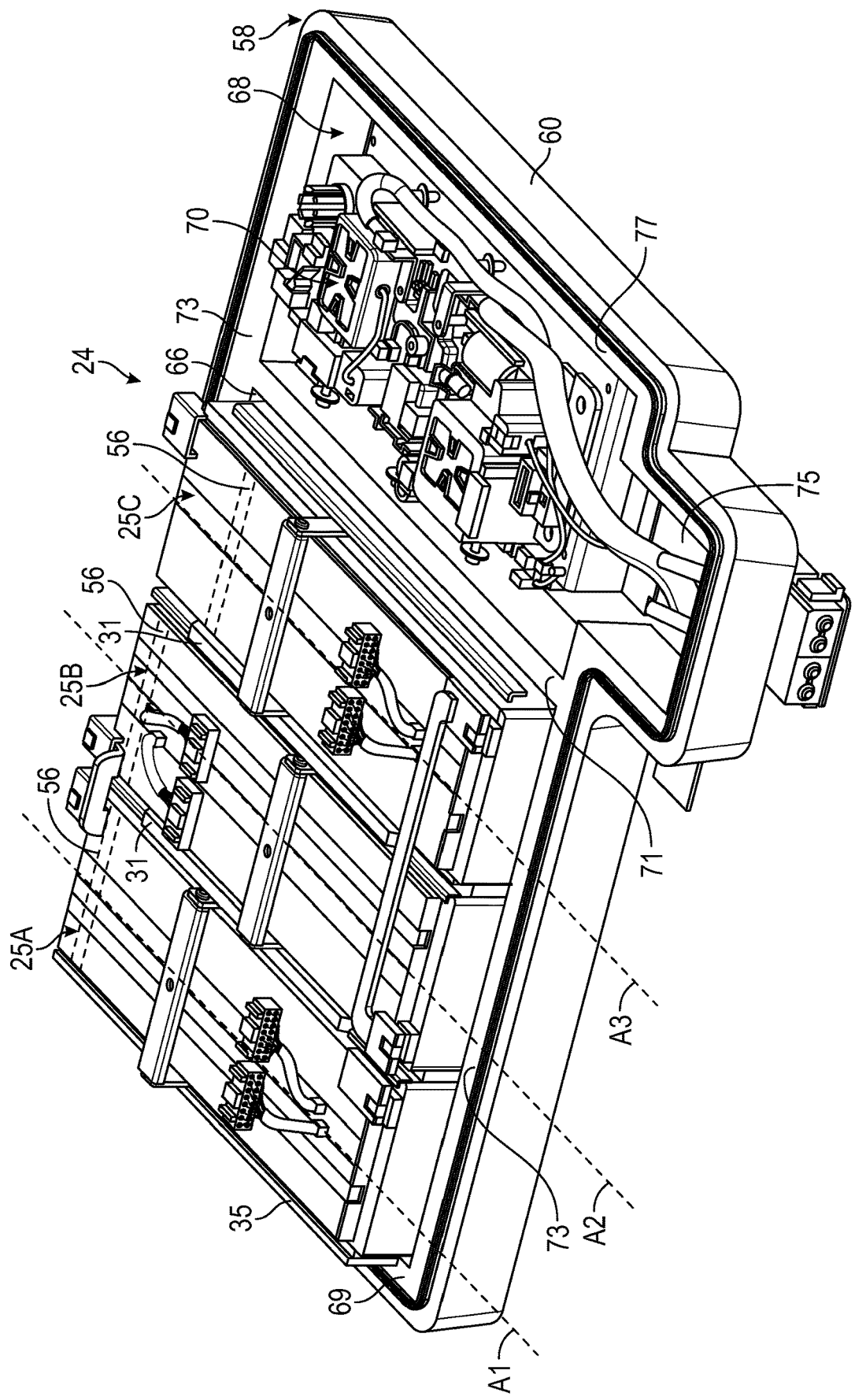
FIG. 4 illustrates select portions of the battery pack of FIG. 2. An enclosure assembly cover is removed in FIG. 4 to illustrate battery internal components.

FIGS. 2, 3, and 4 schematically illustrate a battery pack 24 that can be employed within an electrified vehicle. For example, the battery pack 24 could be incorporated as part of the powertrain 10 of the electrified vehicle 12 of FIG. 1. FIG. 2 is an assembled, perspective view of the battery pack 24, FIG. 3 is an exploded view of an enclosure assembly 58 of the battery pack 24, and FIG. 4 is partial perspective view of the battery pack 24 (with portions of the enclosure assembly 58 removed for better illustrating the internal components of the battery pack 24).

The battery pack 24 houses a plurality of battery cells 56 (best shown in FIG. 4) that store energy for powering various electrical loads of the electrified vehicle 12. The battery pack 24 could employ any number of battery cells within the scope of this disclosure. Therefore, this disclosure is not limited to the exact configuration shown in FIG. 4.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array or battery assembly. The battery pack 24 depicted in FIG. 4 includes a first battery array 25A, a second battery array 25B, and a third battery array 25C. Although the battery pack 24 is depicted as including three battery arrays, the battery pack 24 could include a greater or fewer number of battery arrays and still fall within the scope of this disclosure. Unless stated otherwise herein, when used without any alphabetic identifier immediately following the reference numeral, reference numeral "25" may refer to any of the battery arrays 25A-25C.

The battery cells 56 of the first battery array 25A are distributed along a first longitudinal axis A1, the battery cells 56 of the second battery array 25B are distributed along a second longitudinal axis A2, and the battery cells 56 of the third battery array 25C are distributed along a third longitudinal axis A3. In an embodiment, the longitudinal axes A1 through A3 are laterally spaced from and parallel to one another once the battery arrays 25 are positioned inside the battery pack 24.

An enclosure assembly 58 houses each battery array 25 of the battery pack 24. In an embodiment, the enclosure assembly 58 is a sealed enclosure. The enclosure assembly 58 may include any size, shape, and configuration within the scope of this disclosure.

In an embodiment, the enclosure assembly 58 includes a tray 60, a mid-tray 62, and a cover 64. The tray 60, the mid-tray 62, and the cover 64 cooperate to surround, enclose, and seal the battery arrays 25 and other internal components relative to the exterior environment of the battery pack 24.

The tray 60 may include a first open area 66 for holding the battery arrays 25. The battery arrays 25 are positionable within the first open area 66 of the tray 60. The first open area 66 may be established by a floor 67, a side wall 69, an interior wall 71, and opposing end walls 73 (which connect between the side wall 69 and the interior wall 71) of the tray 60. In an embodiment, the side wall 69, the interior wall 71, and the end walls 73 protrude upwardly from the floor 67 of the tray 60. The interior wall 71 is an optional feature of the battery pack 24.

The tray 60 may additionally include a second open area 68 for holding additional internal components 70. The internal components 70 that may be packaged within the second open area 68 may include a bussed electrical center (BEC), a battery electric control module (BECM), wiring harnesses, wiring looms, I/O connectors, etc. The battery array 25 and the internal components 70 may collectively be referred to in this disclosure as "battery internal components."

The second open area 68 may be established by a floor 75, the interior wall 71, a side wall 77, and the opposing end walls 73 of the tray 60. The interior wall 71 may separate the second open area 68 from the first open area 66.

The mid-tray 62 may be seated and sealed onto the tray 60, such as via a tongue and groove connection, for example. The mid-tray 62 may be approximately the same width and length as the tray 60 such that it engages at least four sides of the tray 60 when seated. The cover 64 may be seated over the mid-tray 62 and sealed to it to enclose the battery internal components. Once both are secured in their respective positions, the mid-tray 62 and the cover 64 may be received together in a nesting fashion.

As best shown in FIGS. 2-3, a portion 55 of the mid-tray 62 may be exposed outside of the enclosure assembly 58. However, the mid-tray 62, including the portion 55, could alternatively be completely housed inside the enclosure assembly 58.

The mid-tray 62 may include one or more pockets 63 (see FIG. 3) for receiving additional internal components of the battery pack 24. The mid-tray 62 and these additional internal components may be preassembled together to form an electrical subassembly before final assembly of the enclosure assembly 58.

The enclosure assembly 58 could have other configurations within the scope of this disclosure. For instance, the mid-tray 62, the cover 64, or both could provide some of the first and second open areas 66, 68 for receiving the battery internal components. In addition, although shown as being substantially rectangular, the enclosure assembly 58 could be triangular, round, rectangular, etc.

In an embodiment, the tray 60 and the mid-tray 62 are constructed (e.g., molded) of an expanded polymer-based material, and the cover 64 is constructed (e.g., molded) of a solid polymer-based material. In another embodiment, the cover 64 is also constructed from an expanded polymer-based material. In yet another embodiment, the cover 64 is constructed from a metallic material. In yet another embodiment, the tray 60 is constructed from a solid polymer based material or a metallic based material.

Exemplary expanded polymer-based materials can include, but are not limited to, expanded polypropylene, expanded polystyrene, expanded polyurethane, and expanded polyethylene. Generally, these polymer-based materials are considered relatively structural foamed polymer-based materials.

Exemplary solid polymer-based materials can include, but are not limited to, sheet moulding compounds (e.g., glass-fiber reinforced polyester), polypropylene, and polyamide. Generally, these polymer-based materials are considered more rigid than the expanded polymer based materials discussed above.

In an embodiment, the battery pack 24 is retained to a vehicle body of the electrified vehicle 12 by one or more straps 95 (see FIG. 2). The straps 95 may be received within grooves 97 formed in the cover 64 of the enclosure assembly 58 and may be fastened to the vehicle body by one or more fasteners 99.

As best shown in FIG. 4, foam spacers 31, which may be expanded polymer foam spacers, may be disposed between adjacent battery arrays 25. Another foam spacer 35 may be positioned between the first battery array 25A and the side wall 69 of the tray 60 and/or between the third battery array 25C and the interior wall 71 and/or between the battery array 25 and one or both of the end walls 73. The foam spacers 31, 35 are configured for filling spaces or gaps inside the battery pack 24. Therefore, all of the parts that are installed onto the tray 60 are fitted together with little to no gaps or clearances therebetween. This gapless arrangement between the battery internals components of the battery pack 24 can help retain components inside the battery pack 24 and may also help dampen durability loads and other types of loads.

Figure 5:
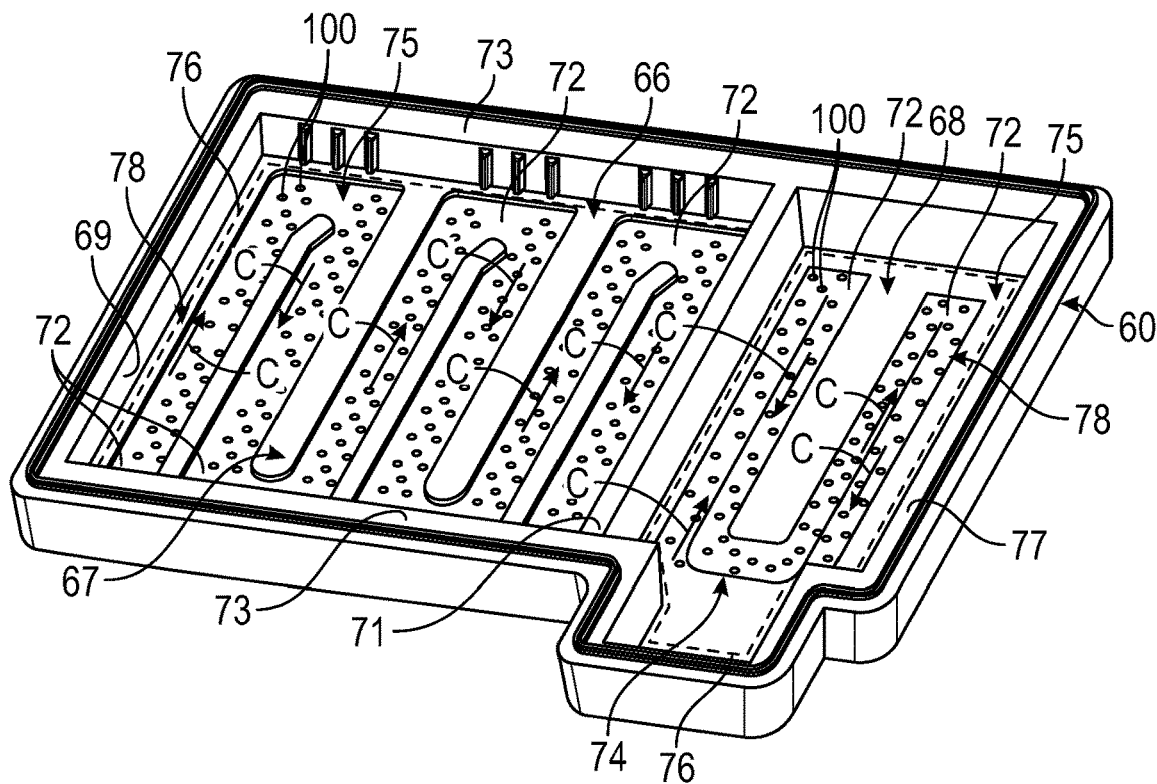
FIGS. 5 and 6 illustrate a tray of the battery pack of FIG. 2.

The tray 60 of the enclosure assembly 58 of the battery pack 24 is further illustrated with reference to FIGS. 5, 6, and 7. One or more channels 72 may be formed in the floor 67 of the first open area 66, the floor 75 of the second open area 68, or both. If channels 72 are provided in both the floor 67 and the floor 75, the channels 72 may be either fluidly isolated from one another or fluidly connected to one another.

In an embodiment, the channels 72 are molded into the floor 67 and/or the floor 75. The channels 72 are therefore considered molded-in features of the tray 60. In an embodiment, the channels 72 are slightly countersunk relative to outer surfaces of the floor 67 and/or the floor 75.

In an embodiment, the channels 72 are arranged relative to one another to establish a serpentine passage 74 in the floor 67 and/or the floor 75 of the tray 60. However, the channels 72 could alternatively be arranged in other manners relative to one another. Therefore, the exact configuration of the channels 72 is not intended to limit this disclosure.

A heat exchanger plate 76 may be positioned against the floor 67 and/or the floor 75 to enclose the channels 72. Therefore, the battery pack 24 may incorporate one or more heat exchanger plates 76.

Together, the channels 72 and the heat exchanger plates 76 establish cooling circuits 78 of the battery pack 24. A coolant C may be communicated within the space between the channels 72 and the inner surface of the heat exchanger plates 76 through the channels 72. The coolant C picks up the heat conducted through the heat exchanger plates 76 from the battery cells 56 of the battery arrays 25 and/or the internal components 70 as it meanders along its path. Although not shown, the coolant C may enter and exit the cooling circuits 78 within a closed loop refrigerant cooling system associated with the battery pack 24.

In an embodiment, the heat exchanger plate(s) 76 is an aluminum cold plate. However, other types of heat exchangers could alternatively be used in conjunction with the molded-in channels 72 to establish the one or more cooling circuits 78.

The channels 72 may include one or more thermal enhancement features 100 for enhancing the thermal transfer between the coolant C and the heat generating components as the coolant C is communicated within the channels 72. The thermal enhancement features 100 may be configured as ribs, fins, pins, or dimples that protrude from surfaces of the channels 72.

Figure 6:
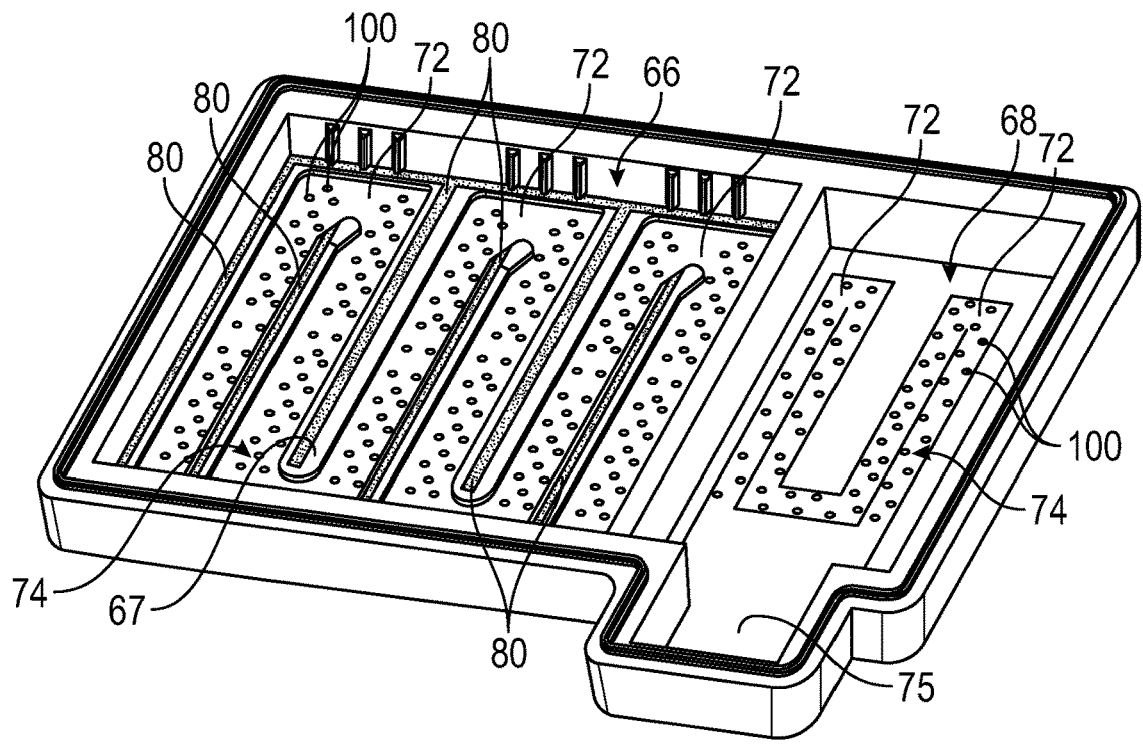
Figure 7:
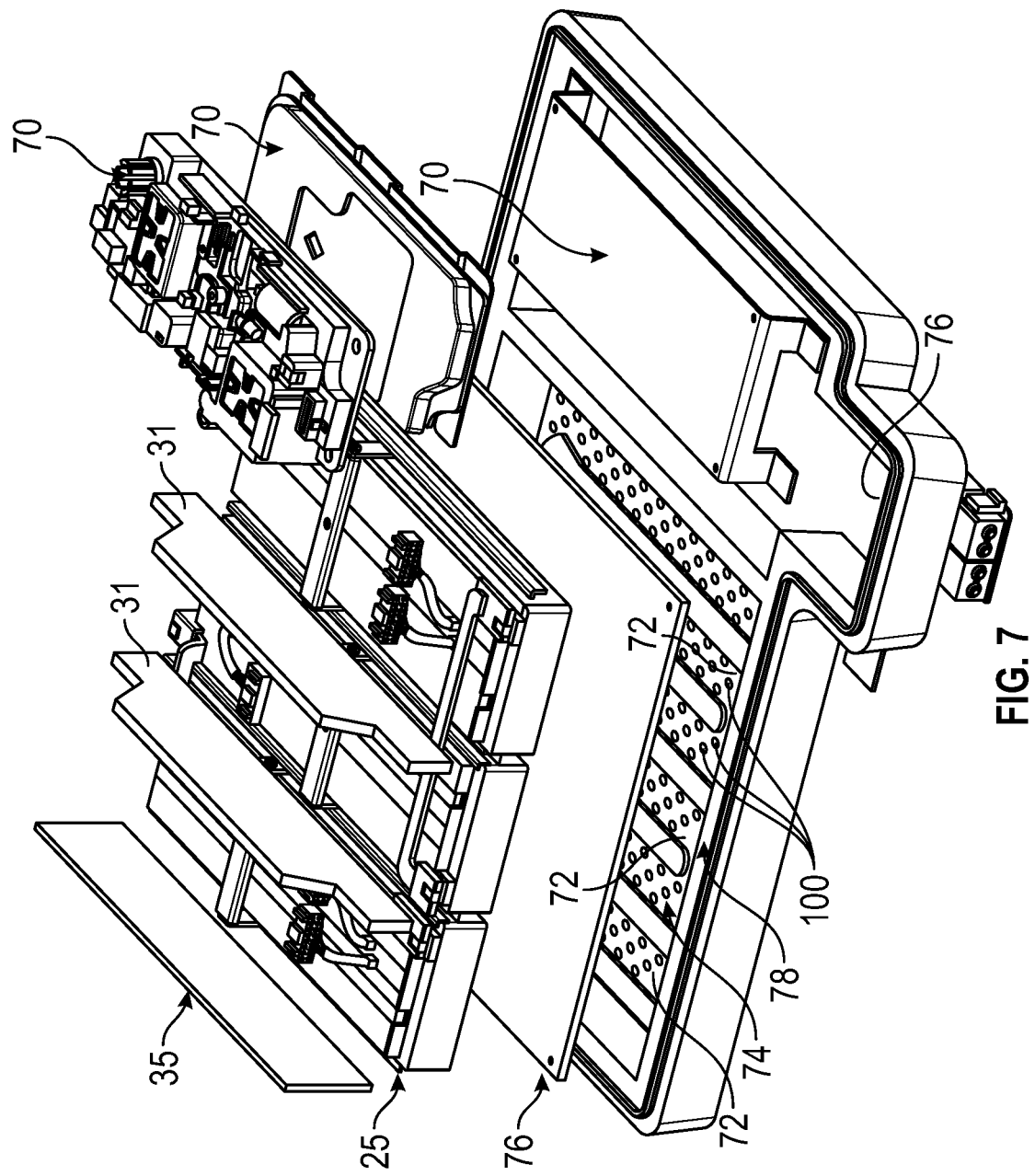
FIG. 7 is an exploded view of the battery pack shown in FIG. 4.
Figure 8:
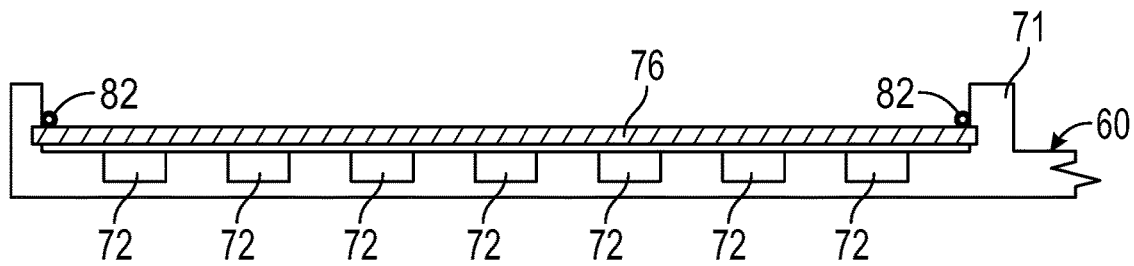
FIG. 8 illustrates a molded-in heat exchanger plate of a battery pack.

In another embodiment, the one or more heat exchanger plates 76 are secured to the floor 67 and/or the floor 75 via a structural adhesive 80 (see FIG. 6). The structural adhesive 80 may be an epoxy or any other suitable adhesive. In another embodiment, the heat exchanger plate 76 is molded into the tray 60 via an overmolding 82 (see FIG. 8). The use of the structural adhesive 80/overmolding 82 to secure the heat exchanger plate 76 in place substantially reduces the number of fasteners that are required be used within the battery pack 24, thereby reducing manufacturing time and costs while at the same time increasing manufacturing throughput.

Figure 9:
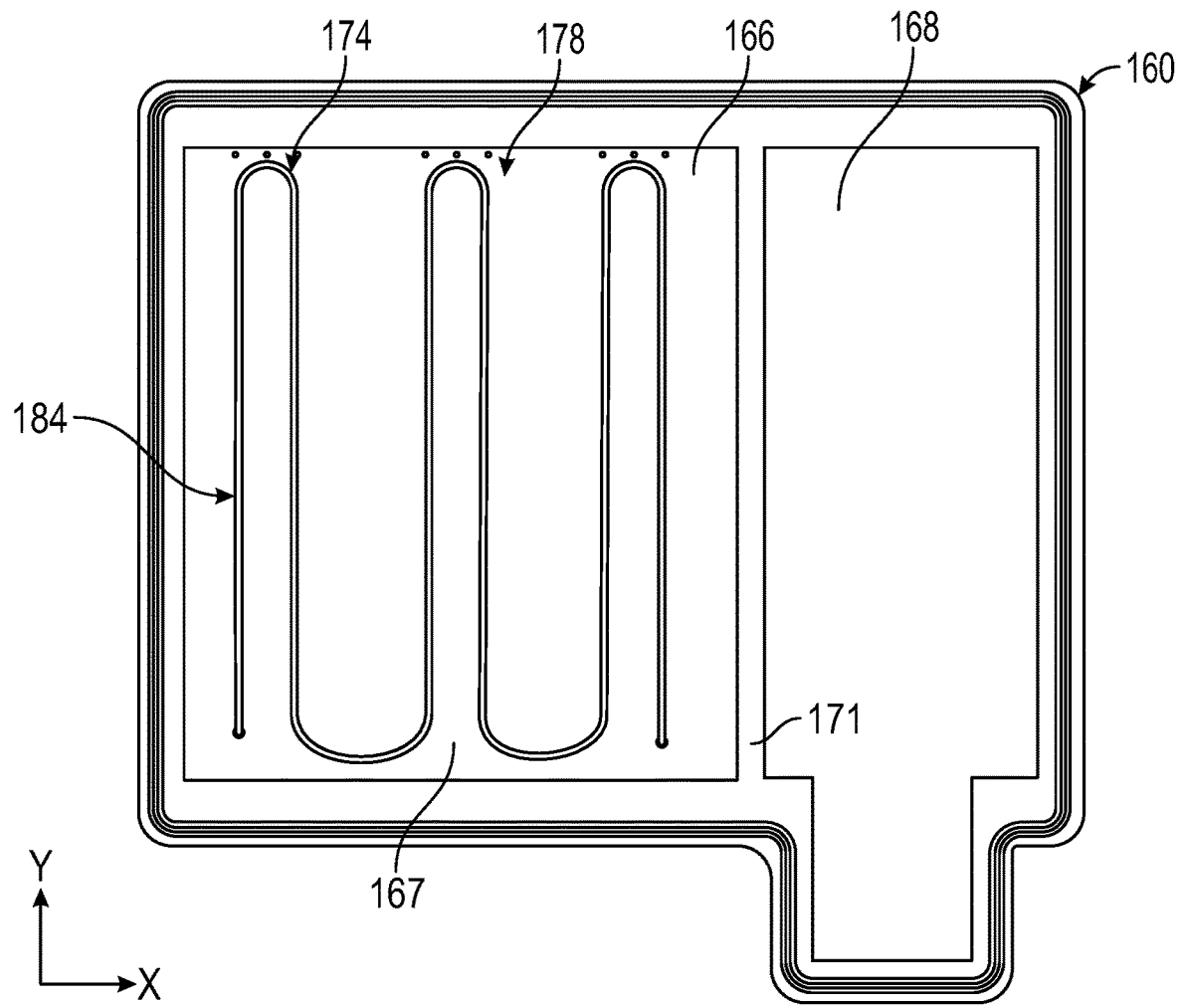
FIG. 9 illustrates another tray of a battery pack enclosure assembly.

FIG. 9 illustrates another exemplary tray 160 that can be employed by the battery pack 24 of the electrified vehicle 12. The tray 160 may include a first open area 166 and a second open area 168. The first open area 166 may be separated from the second open area 168 by an interior wall 171. In an embodiment, one or battery internal components (not shown in this embodiment) may be positioned within each of the first and second open areas 166, 168.

In the illustrated embodiment, tubing 184 can be integrated into a floor 167 of the first open area 166 of the tray 160 for establishing a cooling circuit 178 of the battery pack 24. Although not shown in this exemplary embodiment, additional tubing could alternatively or additionally be integrated into a floor 175 of the second open area 168. The tubing 184 may be made of a metallic material (e.g., copper) or a suitable polymeric material.

In an embodiment, the tubing 184 is arranged in a serpentine or meandering path 174. However, other configurations are also contemplated within the scope of this disclosure. The tubing 184 may include one or more hollow tubes that are connected together to establish the serpentine or meandering path 174 of the cooling circuit. A coolant C may be communicated inside a hollow passage 185 of the tubing 184 (see FIG. 10). The coolant C may conduct heat from the battery cells 56 of the battery arrays 25 and/or the internal components 70 as it meanders along the path 174. Although not shown, the coolant C may enter and exit the tubing 184 within a closed loop refrigerant cooling system associated with the battery pack 24.

Figure 10:
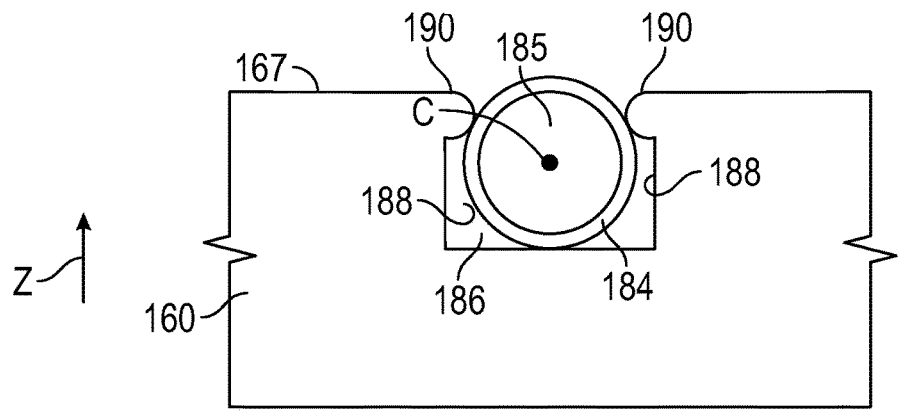
FIG. 10 is a cross-sectional view of the tray of FIG. 9.

In a first embodiment, shown in FIG. 10, the floor 167 of the first open area 166 of the tray 160 includes one or more molded-in channels 186. The channels 186 are sized and shaped to receive the tubing 184 and retain the tubing 184 relative to the tray 160. The channels 186 are countersunk relative to a component contacting surface of the floor 167 and may include walls 188 for retaining the tubing 184 in an X-axis direction and a Y-axis direction. The channels 186 may additionally include snap-in features that are molded into the walls 188 for retaining the tubing in the Z-axis direction. For example, one or more protrusions 190 may protrude inwardly from each wall 188. As the tubing 184 is inserted into the channels 186, the tubing 184 may snap into place within the channels 186 and be retained from further movement in the Z-axis direction. Since the tubing 184 is retained in the X, Y, and Z-axis directions by the channels 186, there is no need for additional fasteners to retain any of the thermal management components of the tray 160.

Figure 11:
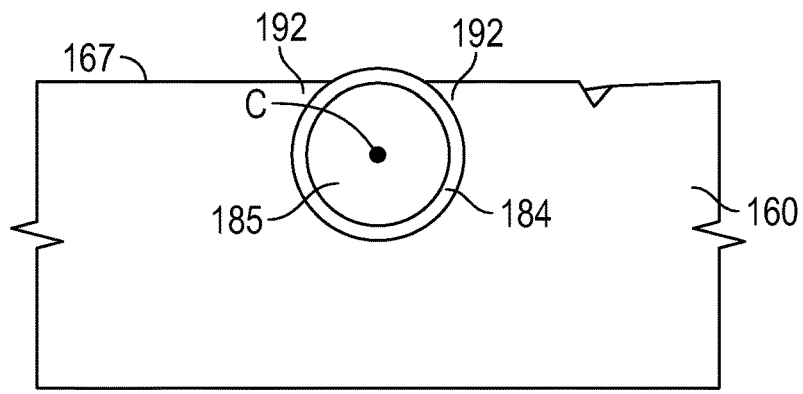
FIG. 11 is a cross-sectional view of another tray.

In a second embodiment, shown in FIG. 11, the tubing 184 may be molded into the floor 167 of the tray 160. The tubing 184 may be integrated into the floor 167 of the tray 160 by an overmolding 192.

Figure 12:
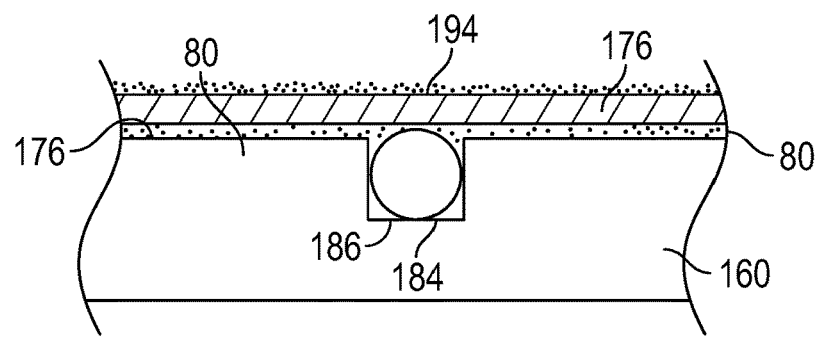
FIG. 12 illustrates a heater exchanger plate of a battery pack.
Figure 13:
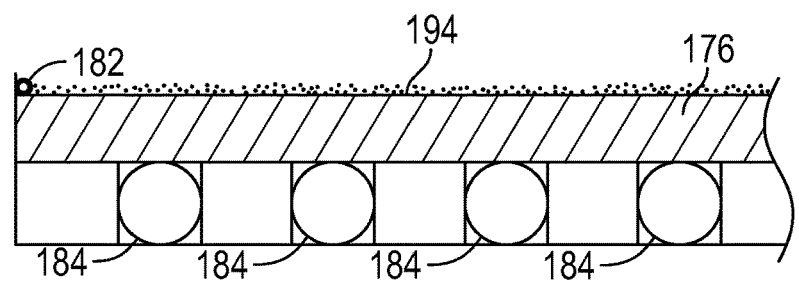
FIG. 13 illustrates another heat exchanger plate of a battery pack.

A heat exchanger plate 176 may optionally be secured over top of the tubing 184. In an embodiment, the heat exchanger plate 176 is secured to the floor 167 via a structural adhesive 80 (see FIG. 12). In another embodiment, the heat exchanger plate 176 is molded into the tray 160 via an overmolding 182 (see FIG. 13). In either case, a thermal interface material 194 (TIM) may be applied onto the heat exchanger plate 176 for improving the thermal contact between the heat exchanger plate 176 and any battery internal components placed thereon, thereby increasing the thermal conductivity between these neighboring components during heat transfer events.

The TIM 194 may be may be made of any known thermally conductive material. In an embodiment, the TIM 194 includes an epoxy resin. In another embodiment, the TIM 194 includes a silicone based material. Other materials, including thermal greases, may alternatively or additionally make up the TIM 194.

The exemplary battery packs of this disclosure include polymer-based enclosure assemblies that incorporate features for thermally managing battery internal components of the battery pack. Among other benefits, the proposed designs reduce the number of overall parts, such as fasteners and brackets, in the pack assembly, increase the thermal energy management capabilities of the battery pack, and simplify the overall battery pack manufacturing process.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   an enclosure assembly including a polymer-based component that establishes at least a portion of an outermost surface of the battery pack; and
   a channel or tubing integrated into a floor of the polymer-based component,
   wherein the floor establishes an interior component contacting surface of the polymer-based component,
   wherein the channel or tubing is configured to establish a cooling circuit for thermally managing a battery internal component housed within the polymer-based component;
   wherein the channel is a molded-in channel formed in the floor of the polymer-based component, and comprising a heat exchanger plate received over the molded-in channel to establish a serpentine passage of the cooling circuit between the channel and the heat exchanger plate; and
   wherein the heat exchanger plate is secured to the polymer-based component by an overmolding.

2. The battery pack as recited in claim 1, wherein the polymer-based component is a tray made of an expanded polymer-based material.

3. The battery pack as recited in claim 1, wherein the polymer-based component is a tray made of a solid polymer-based material.

4. The battery pack as recited in claim 1, wherein the heat exchanger plate is secured to the floor by a structural adhesive.

5. The battery pack as recited in claim 1, wherein the channel is a molded-in channel formed in the floor, and the tubing is received within the molded-in channel such that the battery pack includes both the channel and the tubing.

6. The battery pack as recited in claim 1, wherein the tubing is integrated into the floor by an overmolding.

7. The battery pack as recited in claim 1, wherein the battery internal component is a battery array, a bussed electrical center (BEC), or a battery electric control module (BECM).

8. A battery pack, comprising:
   an enclosure assembly including a tray and a cover received over the tray;
   a molded-in channel formed in a floor of the tray,
   wherein the floor establishes an interior component contacting surface of the tray;
   a tubing received within the molded-in channel;
   a heat exchanger plate secured over the tubing;
   a structural adhesive or an overmolding securing the heat exchanger plate to the floor;
   a thermal interface material applied on the heat exchanger plate; and
   a battery internal component positioned in contact with the thermal interface material,
   wherein the thermal interface material is configured to facilitate thermal conductivity between the heat exchanger plate and the battery internal component.

* * * * *